United States Patent [19]

Parker et al.

[11] Patent Number: 5,216,049
[45] Date of Patent: Jun. 1, 1993

[54] POLYMERIZABLE SYNERGIST AND ANTIDEGRADANT

[75] Inventors: Dane K. Parker, Massillon; Gerald O. Schulz, Stow, both of Ohio

[73] Assignee: The Goodyear Tire & Rubber Company, Akron, Ohio

[21] Appl. No.: 946,722

[22] Filed: Sep. 18, 1992

[51] Int. Cl.$^5$ .................................................. C08K 5/37
[52] U.S. Cl. ...................................... 524/87; 252/401; 252/406; 252/407; 324/94; 324/213; 324/255; 324/257; 524/291; 524/324; 525/291; 526/286; 526/289; 568/38; 568/58
[58] Field of Search ............ 568/38, 58; 525/291; 526/286, 289; 252/406, 401, 407; 524/392, 324, 255, 94, 291, 213, 87, 257

[56] References Cited

U.S. PATENT DOCUMENTS

| | | | |
|---|---|---|---|
| 3,305,522 | 2/1967 | Spacht | 260/45.95 |
| 3,308,104 | 3/1967 | Feldhoff et al. | 526/289 |
| 4,168,387 | 9/1979 | Cottman | 560/144 |
| 4,216,116 | 8/1980 | Kline | 252/404 |
| 4,238,575 | 12/1980 | Kleiner et al. | 524/303 |
| 4,241,217 | 12/1980 | Kuczkowski | 560/152 |
| 4,301,296 | 11/1981 | Kuczkowski | 560/152 |
| 4,354,007 | 10/1982 | Scott | 525/370 |
| 4,604,417 | 8/1986 | Cottman | 524/199 |
| 4,829,115 | 5/1989 | Cottman | 524/304 |

FOREIGN PATENT DOCUMENTS 61-285207 12/1986 Japan.
62-56465 3/1987 Japan.
196650 3/1987 Japan.

OTHER PUBLICATIONS

Index Chemicus 27 86216 (1967).

Primary Examiner—Veronica P. Hoke
Attorney, Agent, or Firm—Bruce J. Hendricks

[57] ABSTRACT

The present invention relates to an antidegradant system comprised of (A) an antidegradant selected from the group consisting of phenolic antidegradants, amine antidegradants and mixtures thereof; and (B) a unique polymerizable synergist. In addition, there is disclosed a stabilized polymer comprising (A) a polymer selected from the group consisting of (1) homopolymers and copolymers of monoolefins; (2) natural rubber; and (3) synthetic rubber derived from a diene monomer; (B) from about 0.05 to about 10 parts by weight based upon 100 parts of polymer of an antidegradant selected from the group consisting of phenolic antidegradants, amine antidegradants and mixtures thereof; and (C) from about 0.05 to about 20 parts by weight based upon 100 parts of polymer of a unique polymerizable aromatic sulfide synergist.

15 Claims, No Drawings

POLYMERIZABLE SYNERGIST AND ANTIDEGRADANT

BACKGROUND OF THE INVENTION

The present invention relates to the combination of a particular polymerizable synergist and a phenolic and/or amine antidegradant.

In addition, the present invention relates to polymers containing a two component stabilizer system.

4-vinyl-1-[2-phenylthio)ethyl]benzene is a polymerizable monomer and is disclosed in JP 56465-1987 as a polymer antidegradant.

Ester materials have been used as synergists in combination with free amine antioxidants and phenolic antioxidants. For example, U.S. Pat. No. 4,216,116 discloses a stabilization system for organic materials comprising a phenolic antioxidant and a polyethyleneoxy diester of a thiopropionic acid. Also, see U.S. Pat. Nos. 4,125,515, 4,241,217 and 4,301,296 which teach the combination of conventional free amine antioxidants with esters which function as synergists, for example, 3,6,9-trioxyaundecane-1,11-bis (3-n-dodecylthio-propionate). Whereas, the esters described in these patents have become commercially available products sold under the trademark Wingstay® SN-1 by The Goodyear Tire & Rubber Company of Akron, Ohio, those skilled in the art are constantly searching for new, improved antidegradant systems to further prolong the life of polymer products. Therefore, there exists a need for compositions which are useful in further prolonging the life of polymers and in particular, rubber compositions.

SUMMARY OF THE INVENTION

The present invention relates to an antidegradant system for polymers comprising the combination of:

(A) an antidegradant selected from the group consisting of phenolic antidegradants, amine antidegradants and mixtures thereof; and (B) a polymerizable synergist having the structural formula:

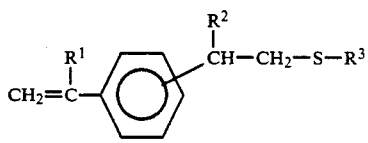

wherein $R^1$ is selected from the group consisting of hydrogen or an alkyl having 1 carbon atoms, $R^2$ is selected from the group consisting of hydrogen or an alkyl having 1 carbon atom, $R^3$ is selected from the group consisting of an alkyl having from 1 to 20 carbon atoms, an aralkyl having from 7 to 20 carbon atoms, an aryl having from 6 to 18 carbon atoms, and an alkaryl having from 7 to 20 carbon atoms.

The present invention also relates to a stabilized polymer comprising:

(A) a polymer selected from the group consisting of:
(1) homopolymers and copolymers of monoolefins;
(2) natural rubber; and
(3) synthetic rubber derived from a diene monomer;

(B) from about 0.05 to about 10 parts by weight based upon 100 parts of polymer of an antidegradant selected from the group consisting of phenolic antidegradants, amine antidegradants and mixtures thereof; and (C) from about 0.05 to about 20 parts by weight based upon 100 parts of polymer of a polymerizable synergist having the structural formula:

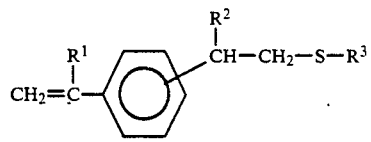

wherein $R^1$ is selected from the group consisting of hydrogen or an alkyl having 1 carbon atoms, $R^2$ is selected from the group consisting of hydrogen or an alkyl having 1 carbon atom, $R^3$ is selected from the group consisting of an alkyl having from 1 to 20 carbon atoms, an aralkyl having from 7 to 20 carbon atoms, an aryl having from 6 to 18 carbon atoms, and an alkaryl having from 7 to 20 carbon atoms.

DETAILED DESCRIPTION OF THE INVENTION

With respect to the above structural formula for the polymerizable synergist, preferably $R^1$ is hydrogen, $R^2$ is hydrogen, and $R^3$ is an alkyl having 1 to 18 carbon atoms and aryl having 6 carbon atoms.

The polymerizable synergists may be preformed and then polymerized along with other monomers. In accordance with another embodiment, the polymerizable synergists may be formed in-situ in the polymerizable reaction mixture, most commonly in solution or latex.

One method of preforming some of the polymerizable synergists is described in JP 56465-1987. In accordance with this method, p-divinylbenzene and thiophenol or its derivative are mixed, and a radical reaction is then carried out using conventional initiators. Representative thiophenol derivatives include $C_1$-$C_4$ alkyl substituted thiophenol such as thiocresol, dimethylbenzene thiol, ethylbenzene thiol and butylbenzene thiol. Examples of initiators include azobisisobutyronitrile, azobis 2,4-dimethylvaleronitrile and peroxides such as benzoyl peroxide, lauroyl peroxide and the like. The initiators should be present in an amount ranging from 0.01 to 10 mole percent to the divinylbenzene. The reaction may be carried out neat (without a solvent) or in the presence of solvents such as benzene, toluene, etc. A nitrogen atmosphere should be used. The molar ratio of p-divinylbenzene to the thiophenol or derivative thereof should range from about 2:1 to 1:2 with a 1:1 ratio being preferred. The reaction temperature should range from about 40° to 80° C. with reaction times ranging from about 1 to 3 hours.

As discussed above, the level of polymerizable synergist may range from about 0.05 to about 20 phr. Preferably, the level of polymerizable synergist ranges from about 0.5 to 2.0 phr. At the higher levels of the broad range, the stabilized polymers may be used as a masterbatch for subsequent blending.

Conventional amine antidegradants may be used in combination with the polymerizable synergist. Representative of the amine antidegradants which may be used include N,N'-di-substituted-p-phenylene diamines, substituted diphenylamines, and both polymerized and non-polymerized derivatives of 2,2,4-trimethyl-1,2-dihydroquinoline as well as the amide and imide age resistors. The derivatives of 2,2,4-trimethyl-1,2-dihydroquinoline are disclosed in U.S. Pat. No. 3,244,683 which is incorporated herein by reference in its entirety.

Representative amide and imide age resisters are described in U.S. Pat. No. 3,658,769 which is incorporated herein in its entirety. Representative of the N,N'-di-substituted-p-phenylene diamines have the following structural formula:

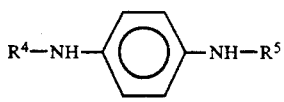

wherein $R^4$ and $R^5$ are independently selected from the group of radicals consisting of alkyls having 3 to 12 carbon atoms, aryls having 6 to 12 carbon atoms, and aralkyls having 7 to 12 carbon atoms. Representative of the diphenylamines which may be used in the present invention are of the formula:

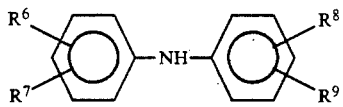

wherein $R^6$, $R^7$, $R^8$ and $R^9$ are independently selected from the group of radicals consisting of hydrogen, alkyls having 1 to 20 carbon atoms and aralkyls having 7 to 12 carbon atoms. Amides which may be used in the present invention are of the structure:

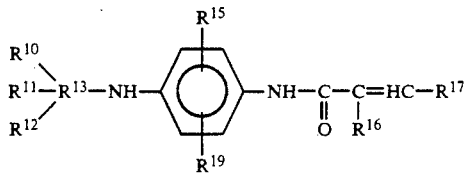

wherein $R^{13}$ is selected from the group of radicals consisting of arylenes having 6 to 12 carbon atoms, $R^{10}$ and $R^{11}$ are independently selected from the group of radicals consisting of hydrogen, alkyls having from 1 to 4 carbon atoms and alkoxys having from 1 to 4 carbon atoms, $R^{12}$ is selected from the group of radicals consisting of hydrogen, alkyls having from 1 to 4 carbon atoms, alkoxys having from 1 to 4 carbon atoms and a radical having the following structural formula:

wherein $R^{18}$ is selected from the group of radicals consisting of alkyls having from 1 to 12 carbon atoms, cycloalkyls having from 5 to 12 carbon atoms, aryls having from 6 to 12 carbon atoms and aralkyls having from 7 to 13 carbon atoms and $R^{19}$ is selected from the group of radicals consisting of hydrogen and alkyls having from 1 to 12 carbon atoms and wherein $R^{14}$ and $R^{15}$ are selected from the group of radicals consisting of hydrogen, alkyls having from 1 to 4 carbon atoms, $R^{16}$ is selected from the group of radicals consisting of hydrogen, alkyls having from 1 to 4 carbon atoms, aryls having from 6 to 12 carbon atoms, aralkyls having from 7 to 13 carbon atoms, cycloalkyls having from 5 to 12 carbon atoms, carboxymethyl radicals and carbalkoxymethyl radicals, and $R^{17}$ is selected from the group of radicals consisting of hydrogen, alkyls having from 1 to 4 carbon atoms, aryls having from 6 to 12 carbon atoms, cycloalkyls having from 5 to 12 carbon atoms, cycloalkyls having from 5 to 12 carbon atoms, carboxyl radicals and carboalkoxy radicals. Preferably $R^{10}$, $R^{11}$ and $R^{12}$ are each hydrogen. $R^{13}$ is preferably an arylene having 6 carbon atoms. $R^{14}$ and $R^{15}$ are preferably hydrogen. Preferably, $R^{16}$ is an alkyl having 1 carbon atom, $R^{17}$ is hydrogen, and $R^{18}$ is an alkyl having 1 carbon atom.

Imides which may be used in combination with the ester of the present invention may have the following structural formula:

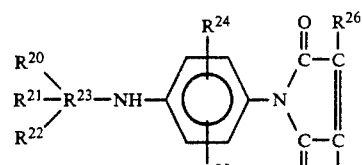

and

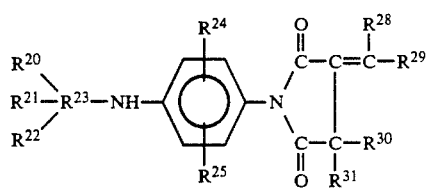

wherein $R^{23}$ is selected from the group of radicals consisting of arylenes having 6 to 12 carbon atoms, $R^{20}$ and $R^{21}$ are independently selected from the group of radicals consisting of hydrogen, alkyls having from 1 to 4 carbon atoms and alkoxys having from 1 to 4 carbon atoms, $R^{22}$ is selected from the group of radicals consisting of hydrogen, alkyls having from 1 to 4 carbon atoms, alkoxys having from 1 to 4 carbon atoms and a radical having the following structural formula:

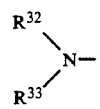

wherein $R^{32}$ is selected from the group of radicals consisting of alkyls having from 1 to 12 carbon atoms, cycloalkyls having from 5 to 12 carbon atoms, aryls having from 6 to 12 carbon atoms and aralkyls having from 7 to 13 carbon atoms and $R^{33}$ is selected from the group of radicals consisting of hydrogen and alkyls having from 1 to 12 carbon atoms and wherein $R^3$ and $R^4$ are alkyls having from 1 to 4 carbon atoms, and wherein $R^{26}$, $R^{27}$, $R^{28}$, $R^{29}$, $R^{30}$ and $R^{31}$ are independently selected from the group of radicals consisting of hydrogen and alkyls having 1 to 4 carbon atoms. Preferably, $R^{20}$ and $R^{21}$ are hydrogen, $R^{22}$ is hydrogen, $R^{23}$ is an arylene having 6 carbon atoms, $R^{24}$ is hydrogen, $R^{25}$ is hydrogen, $R^{26}$ is hydrogen, $R^{27}$ is hydrogen, $R^{28}$ is hydrogen, $R^{29}$ is hydrogen, $R^{30}$ is hydrogen, and $R^{31}$ is hydrogen.

Specific amines which may be used in combination with the polymerizable synergist include
N,N'-diphenyl-p-phenylenediamine,
N,N'-di-beta-naphthyl-p-phenylenediamine,
N-o-tolyl-N'-phenyl-p-phenylenediamine,
N,N-di-p-tolyl-p-phenylenediamine, N-1,3-dimethylbutyl-N'-phenyl-p-phenylenediamine,
N-1,4-dimethylpentyl-N'-phenyl-p-phenylenediamine,
N-isopropyl-N'-phenyl-p-phenylenediamine,
N-1-methylpropyl-N'-phenyl-p-phenylenediamine,
N-cyclohexyl-N'-phenyl-p-phenylenediamine,
N,N'-bis-(1-ethyl-3-methylpentyl)-p-phenylenediamine,
N,N'-bis-(1,4-dimethylpentyl)-p-phenylenediamine,
N,N'-bis-(1-methylpropyl)-p-phenylenediamine,
4,4'-bis-(di-alpha-methylbenzyl)-diphenylamine,
4,4'-dioctyldiphenylamine, 4,4'-dinonyldiphenylamine,
polymerized-2,2,4-trimethyl-1,2-dihydroquinoline,
6-dodecyl-1,2-dihydro-2,2,4-trimethylquinoline,
6-ethoxy-1,2-dihydro-2,2,4-trimethylquinoline,
N-(4-anilinophenyl)methacrylamide,
N-(4-anilinophenyl)maleimide,
N-(4-anilinophenyl)itaconimide,
N-(4-anilinophenyl)citraconimide,
N-[4-(4-methylanilino)phenyl]maleimide,
N-[4-(4-methylanilino)phenyl]itaconimide,
N-[4-(4-methoxyanilino)phenyl]maleimide,
N-[4-(4-methoxyanilino)phenyl]itaconimide,
N-[4-(4-ethoxyanilino)phenyl]maleimide,
N-[4-(4-ethoxyanilino)phenyl]itaconimide,
N-[4-(4-ethoxyanilino)phenyl]citraconimide,
N-(4-anilinophenyl)phenylmaleimide,
N-[4-(4-N,N-dimethylaminoanilino)phenyl]maleimide,
N-(4-anilinophenyl)acrylamide,
N-(4-anilinophenyl)methacrylamide,
N-(4-anilinophenyl)cinnamamide,
N-(4-anilinophenyl)crotonamide,
N-[4-(4-methylanilino)phenyl]acrylamide,
N-[4-(4-methylanilino)phenyl]methacrylamide,
N-[4-(4-methoxyanilino)phenyl]acrylamide,
N-[4-(4-methoxyanilino)phenyl]methacrylamide,
N-[4-(4-ethoxyanilino)phenyl]acrylamide,
N-[4-(4-ethoxyanilino)phenyl]methacrylamide,
N-[4-(4-N,N-dimethylaminoanilino)phenyl]acrylamide,
N-(4-anilinophenyl)maleamic acid,
N-(4-anilinophenyl)itaconamic acid,
N-[4-(4-methylanilino)phenyl]maleamic acid, and
N-(4-anilinophenyl)citraconamic acid.

In accordance with the preferred embodiment of the present invention, a polymerizable amine antidegradant is used in combination with the polymerizable synergist. The preferred polymerizable amine antidegradants include N-(4-anilinophenyl)methacrylamide and N-(4-anilinophenyl)acrylamide.

The level of amine antidegradant that is present in the polymer may range from about 0.05 to 10.0 parts by weight per 100 parts by weight of polymer. Preferably, the level of amine is from about 0.5 to 2.0 parts by weight.

Phenolic antidegradants also benefit by the presence of the polymerizable synergist. One example of a conventional phenolic antidegradant is represented by the following structural formula:

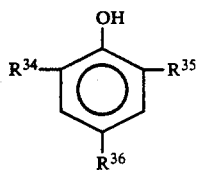

wherein $R^{34}$ and $R^{35}$ are selected from the group of radicals consisting of hydrogen, tertiary alkyls having 4 to 9 carbon atoms, cycloalkyls having 5 to 12 carbon atoms and aralkyls having 7 to 12 carbon atoms and wherein $R^{36}$ is selected from the group of radicals consisting of alkyls having 1 to 20 carbon atoms, cycloalkyls having 5 to 12 carbon atoms and aralkyls having 7 to 12 carbon atoms.

Specific examples of phenolic antidegradants of the above structural formula include 2,6-di-tertiarybutyl-4-methyl phenol, 2-tertiaryoctyl-4,6-ditertiarybutyl phenol, 2,4,6-tris-(α-methylbenzyl)phenol, 4-nonylphenol, 2,4-dinonylphenol, and 2,4-bis(α,α-dimethylbenzyl)-6-tertiarybutylphenol. A preferred phenolic antidegradant of the above structural formula is Wingstay ®-C which is commercially available from The Goodyear Tire & Rubber Company of Akron, Ohio.

Additional phenolic antidegradants which may be used in combination with the polymerizable synergist are the alkylated reaction products of simple phenols and dicyclopentadiene. Examples of such phenolic antidegradants are described in U.S. Pat. No. 3,305,522 which is incorporated herein by reference. A commercially available antioxidant of this type is sold under the trademark Wingstay ®-L from The Goodyear Tire & Rubber Company of Akron, Ohio.

Additional phenolic antidegradants which may be used in combination with the polymerizable synergist are described and illustrated in U.S. Pat. No. 3,080,338, which is incorporated herein by reference.

Polymerizable phenolic antidegradants may be used in combination with the polymerizable synergist. Representative polymerizable phenolic antidegradants are described in U.S. Pat. No. 4,168,387, which is incorporated herein by reference in its entirety. These polymerizable phenolic antidegradants are the reaction product of (1) a polyphenolic compound selected from the group consisting of 2,6-bis-(2-hydroxy-3-tert.butyl-5-methylbenzyl)-4-methylphenol; 2,2'-methylene-bis-(4-ethyl-6-tert.butylphenol); and 2,6-bis-(2-hydroxy-3-tert.butyl-5-ethylbenzyl)-4-ethylphenol, with (2) an ester forming compound of the general formula:

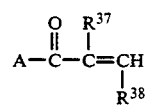

wherein $R^{37}$ is selected from the group consisting of hydrogen an alkyl radicals having from 1 to 4 carbon atoms; $R^{38}$ is selected from the group consisting of hydrogen and alkyl radicals having from 1 to 4 carbon atoms, and wherein A is selected from the group consisting of chlorine, iodine and bromine. Representative examples of these polymerizable antidegradants include 2-(2-hydroxy-3-tert.butyl-5-methylbenzyl)-4-methyl-6-tert.butyl phenylmethacrylate; 2-(2-hydroxy-3-tert.butyl-5-methylbenzyl)-4-ethyl-6-tert.butyl phenylmethacrylate; 2,6-bis-(2-hydroxy-3-tert.butyl-5-methylbenzyl)-4-methyl phenylmethacrylate; and 2-(2-hydroxy-3-tert.butyl phenylacrylate).

In accordance with the preferred embodiment of the present invention, a polymerizable phenolic antidegradant is used in combination with the polymerizable synergist.

The level of the phenolic antidegradant may vary and range from about 0.05 to 10 parts by weight per 100 parts by weight of the polymer. Preferably, the level of phenolic antidegradant ranges from about 0.5 to about 2.0 parts by weight.

The weight ratio of the polymerizable synergist of the present invention to either the amine or phenolic antidegradants may vary. Generally speaking, the molar ratio of amine or phenolic antidegradant to polymerizable synergist ranges from about 1:4 to 2:1. Preferably, the molar ratio ranges from about 1:2 to about 1:1.

Various polymers may be stabilized by use of the combination of polymerizable synergist and the amine or phenolic antidegradant. Representative polymers include homopolymers and copolymers of monoolefins, e.g., polypropylene, polyethylene and ethylene/propylene copolymers. The combination of the polymerizable synergist and antidegradant may also be used with sulfur vulcanizable elastomers. The term "sulfur vulcanizable elastomers or rubber" as used herein embraces both natural and all its various low and reclaim forms as well as various synthetic rubbers. Representative synthetic polymers which are derived from a diene monomer, such as the homopolymerization products of butadiene and its homologues and derivatives, as for example, isoprene, dimethylbutadiene and pentadiene as well as copolymers such as those formed from butadiene or its homologues or derivatives with other unsaturated organic compounds. Among the latter are acetylene e.g. vinyl acetylene; olefins, for example, isobutylene, which copolymerizes with isoprene to form butyl rubber; vinyl compounds, for example vinylchloride, acrylic acid, acrylonitrile (which polymerize with butadiene to form NBR or which polymerizes with polybutadiene and styrene to form ABS), methacrylic acid and styrene, the latter compound polymerizing with butadiene to form SBR as well as vinyl esters and various unsaturated aldehydes, ketones and ethers, e.g., acrolein, methyl isopropenyl ketone and vinylethyl ether. Also included are the various synthetic rubbers prepared by the homopolymerization of isoprene and the copolymerization of isoprene with other diolefins and various unsaturated organic compounds. Also included are the synthetic rubbers such as 1,4-cis polybutadiene and 1,4-cis polyisoprene and similar synthetic rubbers such as EPDM. The preferred rubbers are ABS, polybutadiene, butyl rubber, styrene-butadiene-isoprene copolymers, EPDM, butadiene-styrene copolymers and polyisoprene.

The combination of the polymerizable synergist and antidegradant may be compounded in either productive or nonproductive stock. Incorporation of the combination into the polymer may be accomplished by conventional means of mixing such as by the use of Banburys, Brabenders, extruders, etc. Alternatively, the synergist and antidegradant may be polymerized and thus becomes polymer bound. Another alternative is to graft the synergist and/or antidegradant to the polymer in latex form. In a preferred embodiment, the combination of the polymerizable synergist and the antidegradant (also polymerizable) are incorporated in an emulsion and polymerized in the reactor along with the monomers to result in a polymer-bound stabilizer system.

The following examples are provided to illustrate but not limit the scope of the present invention.

EXAMPLE 1

Preparation of Vinyl-1-[(2-phenylthio)ethyl]benzene

Into a 500 ml 3 necked flask equipped with a mechanical stirrer, $N_2$ inlet, thermometer and dropping funnel was charged 173.7 grams of an emulsion ($\approx$0.2 moles) made from 32.3 grams of 80.5% by weight divinylbenzene, 1.4 grams of dodecylbenzene sulfonic acid and 140 ml of $H_2O$. 28.6 grams (0.26 moles) of thiophenol was added via a dropwise funnel over a period of one hour. During addition of the thiophenol, the emulsion was agitated under a $N_2$ atmosphere. There was a 12° C. exotherm over the course of the reaction. GC analysis confirms formation of a polymerizable synergist that is used in the present invention. GC confirms the formation of the desired product and complete consumption of the thiophenol.

EXAMPLE 2

Preparation of Vinyl-1-[(2-phenylthio)ethyl]benzene

Into a 200 cc cylindrical beaker equipped with a mechanical stirrer was charged 16.15 grams (0.1 mole) of 80.5% divinylbenzene, 13.09 grams (0.12 moles) of thiophenol, 0.05 grams of 2,2'-azoisobutyronitrile, 0.732 grams of dodecylbenzene sulfonic acid and 70.72 grams of distilled water. The mixture was blended under agitation for approximately three minutes during which the pH of the mixture was adjusted to $\approx$8.0 with 50% KOH. GC analysis confirmed formation of the desired product.

EXAMPLE 3

A series of NBR rubbers were prepared via cold polymerization according to the recipe shown in Table I. The soft water, tetrasodium pyrophosphate, soaps, mercaptan, hydroperoxide, methylacrylamide, polymerizable synergist and acrylonitrile were charged into the reactors and nitrogen was bubbled through the emulsion to purge air. The butadiene was charged to the reactor followed by introduction of iron solution. The emulsion was maintained to 18° C. for 7-8 hours. Polymerizations were shortstopped at desired conversion by addition of dilute aqueous solution of 13 parts soft water, 0.10 parts of sodium dimethyldithiocarbamate, 0.10 parts of diethylhydroxylamine and 0.17 parts of 2,5-ditertiaryamyl hydroquinone. Samples of all NBR rubbers were coagulated in isopropanol then isopropanol extracted to remove residual soap and unbound monomers including antioxidants. All samples were dried in a vacuum oven and analyzed by DSC. DSC results are provided in Table I.

TABLE I

| Sample NBR | "Cold" NBR Polymerization Recipes | | | | | | | | | | | |
|---|---|---|---|---|---|---|---|---|---|---|---|---|
| | A | B | C | D | E | F | H | I | J | K | L | M |
| Soft Water | 200 | 200 | 200 | 200 | 200 | 200 | 200 | 200 | 200 | 200 | 200 | 200 |
| Tetrasodium Pyrophosphate | 0.20 | 0.20 | 0.20 | 0.20 | 0.20 | 0.20 | 0.20 | 0.20 | 0.20 | 0.20 | 0.20 | 0.20 |
| Mixed Fatty Acid Potassium Soap | 1.50 | 1.50 | 1.50 | 1.50 | 1.50 | 1.50 | 1.50 | 1.50 | 1.50 | 1.50 | 1.50 | 1.50 |
| Westvaco Diacid[1] 1550/K Soap | 0.70 | 0.70 | 0.70 | 0.70 | 0.70 | 0.70 | 0.70 | 0.70 | 0.70 | 0.70 | 0.70 | 0.70 |
| t-Dodecyl mercaptan | 0.65 | 0.65 | 0.65 | 0.65 | 0.65 | 0.65 | 0.65 | 0.65 | 0.65 | 0.65 | 0.65 | 0.65 |
| p-Menthane | 0.09 | 0.09 | 0.09 | 0.09 | 0.09 | 0.09 | 0.09 | 0.09 | 0.09 | 0.09 | 0.09 | 0.09 |

TABLE I-continued

| Sample NBR | "Cold" NBR Polymerization Recipes | | | | | | | | | | | |
|---|---|---|---|---|---|---|---|---|---|---|---|---|
| | A | B | C | D | E | F | H | I | J | K | L | M |
| Hydroperoxide (55%) | | | | | | | | | | | | |
| Acrylonitrile | 33.0 | 33.0 | 33.0 | 33.0 | 33.0 | 33.0 | 33.0 | 33.0 | 33.0 | 33.0 | 33.0 | 33.0 |
| Butadiene | 67.0 | 67.0 | 67.0 | 67.0 | 67.0 | 67.0 | 67.0 | 67.0 | 67.0 | 67.0 | 67.0 | 67.0 |
| Iron Solution[2] | 3.0 | 7.0 | 7.0 | 3.0 | 7.0 | 3.0 | 7.0 | 7.0 | 7.0 | 7.0 | 7.0 | 7.0 |
| Sodium Formaldehyde Sulfoxylate | 0.05 | 0.05 | 0.05 | 0.05 | 0.05 | 0.05 | 0.05 | 0.05 | 0.05 | 0.05 | 0.05 | 0.05 |
| N-(4-anilinophenyl)-methacrylamide | — | 1.58 | 1.58 | — | 1.58 | — | 1.58 | 1.58 | 1.58 | 1.58 | 1.58 | 1.58 |
| Vinyl-1-[(2-phenylthio)ethyl]benzene | — | — | 1.0 | 1.0 | — | — | 0.25 | 0.50 | 1.5 | 2.0 | 3.0 | 4.0 |
| Divinyl benzene (55%) | — | — | — | 1.0 | 1.0 | — | 0 | 0 | 0 | 0 | 0 | 0 |
| Conversion (%) | 84.4 | 93.8 | 85.2 | 84.5 | 83.0 | 85.8 | 86 | 95 | 86 | 85 | 84.3 | 86.5 |
| DSC Data[3] | | | | | | | | | | | | |
| Onset Temperature (°C.) | 154 | 226 | 237 | 154 | 218 | 151 | 215 | 221 | 225 | 230 | 231 | 231 |
| Max. Temperature (°C.) | 168 | 237 | 241 | 178 | 234 | 160 | 231 | 234 | 239 | 239 | 238 | 239 |

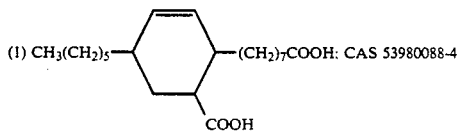

(1) $CH_3(CH_2)_5$—⟨ ⟩—$(CH_2)_7COOH$; CAS 53980088-4

COOH

[2]Solution of 0.68 grams $FeSO_4.7H_2O$, 4.0 grams of 38% aqueous $Na_4EDTA$ in 1.0 liter of water adjusted to pH 5.0 with dilute $H_2SO_4$.
[3]Room temperature to 130° C. at 15° C./min. then 130° C. to 280° C. at 2° C./min. in pure oxygen.

As can be seen from the DSC data, the use of the polymerizable synergist (Sample C) raises the oxidation onset temperature by 11° C. versus the use of the amine antidegradant alone (Sample B) or the use of the polymerizable synergist alone (Sample D). Samples H-M demonstrate that with 1.58 parts of a particular polymerizable antidegradant, the optimum amount of polymerizable synergist is approximately 2 parts.

EXAMPLE 4

A SBR rubber was prepared via cold polymerization according to the recipe shown in Table II. The deionized water, potassium sulfate, soaps, mercaptan, iron solution and styrene were charged into the reactor and nitrogen was bubbled through the emulsion to purge air. The butadiene was charged to the reactor followed by introduction of hydroperoxide. The emulsion was maintained at 10° C. for 15.5 hours. The polymerization was shortstopped at desired conversion by addition of a dilute aqueous solution containing 8 parts water, 0.10 parts of sodium dimethyldithiocarbamate, 0.05 parts of diethylhydroxylamine and 0.22 parts of potassium pyrophosphate.

TABLE II

| Preparation of Standard SBR | |
|---|---|
| Soft Water | 141 |
| Potassium Sulfate | 0.40 |
| Tamol ™ SN[1] | 0.4 |
| Sodium Formaldehyde Sulfoxylate | 0.12 |
| Activator[2] | 0.05 |
| Oleic Acid Potassium Salt | 3.1 |
| Sodium Hydrosulfite | 0.03 |
| Styrene | 30.0 |
| t-Dodecyl Mercaptan | 0.19 |
| Butadiene | 70.0 |
| α-Pinene Hydroperoxide | 0.136 |

[1]Tamol ™ SN is sodium salt of condensed naphthalene sulfonic acid (85% active) commercially available from Rohm & Haas.
[2]Solution of 30.0 grams of the $FeSO_4.7H_2O$, 118.2 grams of 38% aqueous $Na_4EDTA$ in 820 ml of water adjusted to pH 3.0 with dilute $H_2SO_4$.

EXAMPLE 5

To a reactor charged 226 parts of the SBR latex prepared in Example 4 was added the water, antioxidant emulsion and synergist emulsion of Example 1 (B sample only) according to Table III. Nitrogen was bubbled through the emulsion to purge air. The reactors were sealed and the latex was agitated for 3 hour at 21° C. The sulfoxylate solution and iron solution were charged to the reactor followed by the hydroperoxide addition. The latex was then agitated for 8 hours under nitrogen at 21° C. The reaction was then shortstopped with an aqueous solution of 0.15 parts sodium dimethyldithiocarbamate and 0.08 parts of diethylhydroxylamine in 8 parts of soft water. Samples of the stabilized SBR were coagulated in isopropanol then isopropanol extracted to remove residual soap and unbound monomers including antioxidants. Dried samples were analyzed by DSC. DSC results as measured by the onset temperature in pure oxygen as in footnote 3 in Table I. The onset temperature for Sample A was 185° C. and the onset temperature for Sample B was 198° C.

TABLE III

| | Sample A | Sample B |
|---|---|---|
| SBR Latex from Example 4 | 226.0 | 226.0 |
| Soft Water | 60.0 | 60.0 |
| Polymerizable Antioxidant Emulsion[1] (5% Active) | 20.0 | 20.0 |
| The emulsion containing vinyl-2-[(2-phenylthio)ethyl]-benzene | 0 | 5.0 |

TABLE III-continued

|  | Sample A | Sample B |
|---|---|---|
| from Ex. 1 (ca 20 weight % actives) |  |  |
| Sodium Formaldehyde Sulfoxylate | 0.20 | 0.20 |
| Iron Solution[2] | 6.0 | 6.0 |
| p-Menthane Hydroperoxide | 0.33 | 0.33 |

[1]N-(4-anilinophenyl)methacrylamide 10 parts, tributoxyethyl phosphate 20 parts, Igepal CO-880 (nonionic surfactant commercially available from GAF Corporation) 2 parts, soft water 167 parts and sodium salt of condensed naphthalene sulfonic acid 1.0 parts.
[2]Solution of 0.69 grams $FeSO_4.7H_2O$, 4.0 grams of 38% aqueous $Na_4$ EDTA in 1.0 liter of water adjusted to pH 5.0 with dilute $H_2SO_4$.

What is claimed is:

1. An antidegradant system comprised the combination of:
   (A) an antidegradant selected from the group consisting of phenolic antidegradants, amine antidegradants and mixtures thereof; and
   (B) a polymerizable synergist having the structural formula:

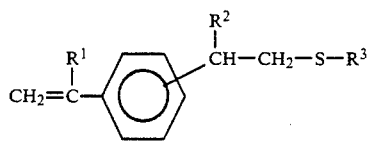

wherein $R^1$ is selected from the group consisting of hydrogen or an alkyl having 1 carbon atoms, $R^2$ is selected from the group consisting of hydrogen or an alkyl having 1 carbon atom, $R^3$ is selected from the group consisting of an alkyl having from 1 to 20 carbon atoms, an aralkyl having from 7 to 20 carbon atoms, an aryl having from 6 to 18 carbon atoms, and an alkaryl having from 7 to 20 carbon atoms.

2. The antidegradant system of claim 1 wherein the molar ratio of antidegradant to polymerizable synergist ranges from about 1:4 to 2:1.

3. The antidegradant system of claim 1 wherein $R^1$ is hydrogen, $R^2$ is hydrogen, and $R^3$ is selected from the group consisting of alkyl having 1 to 18 carbon atoms and an alkyl having 6 carbon atoms.

4. The antidegradant system of claim 2 wherein the ratio of antidegradant to polymerizable synergist ranges from about 1:2 to 1:1.

5. The antidegradant system of claim 1 wherein the amine antioxidant is selected from the group consisting of polymerized and non-polymerized derivatives of:
   (A) 2,2,4-trimethyl-1,2-dihydroquinoline;
   (B) N,N'-di-substituted-p-phenylenediamines having the structural formula:

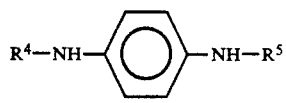

wherein $R^4$ and $R^5$ are independently selected from the group of radicals consisting of alkyls having 3 to 12 carbon atoms, aryls having 6 to 12 carbon atoms, and aralkyls having 7 to 12 carbon atoms;
   (C) diphenylamines having the structural formula:

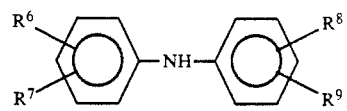

wherein $R^6$, $R^7$, $R^8$ and $R^9$ are independently selected from the group of radicals consisting of hydrogen, alkyls having 1 to 20 carbon atoms and aralkyls having 7 to 12 carbon atoms;
   (D) amides having the structural formula:

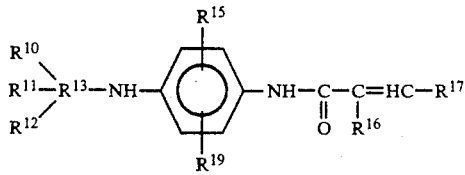

wherein $R^{13}$ is selected from the group of radicals consisting of arylenes having 6 to 12 carbon atoms, $R^{10}$ and $R^{11}$ are independently selected from the group of radicals consisting of hydrogen, alkyls having from 1 to 4 carbon atoms and alkoxys having from 1 to 4 carbon atoms, $R^{12}$ is selected from the group of radicals consisting of hydrogen, alkyls having from 1 to 4 carbon atoms, alkoxys having from 1 to 4 carbon atoms and a radical having the following structural formula:

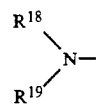

wherein $R^{18}$ is selected from the group of radicals consisting of alkyls having from 1 to 12 carbon atoms, cycloalkyls having from 5 to 12 carbon atoms, aryls having from 6 to 12 carbon atoms and aralkyls having from 7 to 13 carbon atoms and $R^{19}$ is selected from the group of radicals consisting of hydrogen and alkyls having from 1 to 12 carbon atoms and wherein $R^{14}$ and $R^{15}$ are selected from the group of radicals consisting of hydrogen, alkyls having from 1 to 4 carbon atoms, $R^{16}$ is selected from the group of radicals consisting of hydrogen, alkyls having from 1 to 4 carbon atoms, aryls having from 6 to 12 carbon atoms, aralkyls having from 7 to 13 carbon atoms, cycloalkyls having from 5 to 12 carbon atoms, carboxymethyl radicals and carbalkoxymethyl radicals, and $R^{17}$ is selected from the group of radicals consisting of hydrogen, alkyls having from 1 to 4 carbon atoms, aryls having from 6 to 12 carbon atoms, cycloalkyls having from 5 to 12 carbon atoms, cycloalkyls having from 5 to 12 carbon atoms, carboxyl radicals and carboalkoxy radicals, and;
   (E) imides having the structural formula:

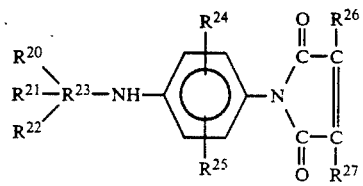

-continued and

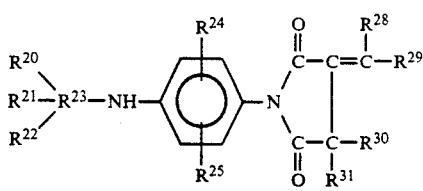

wherein $R^{23}$ is selected from the group of radicals consisting of arylenes having 6 to 12 carbon atoms, $R^{20}$ and $R^{21}$ are independently selected from the group of radicals consisting of hydrogen, alkyls having from 1 to 4 carbon atoms and alkoxys having from 1 to 4 carbon atoms, $R^{22}$ is selected from the group of radicals consisting of hydrogen, alkyls having from 1 to 4 carbon atoms, alkoxys having from 1 to 4 carbon atoms and a radical having the following structural formula:

wherein $R^{32}$ is selected from the group of radicals consisting of alkyls having from 1 to 12 carbon atoms, cycloalkyls having from 5 to 12 carbon atoms, aryls having from 6 to 12 carbon atoms and aralkyls having from 7 to 13 carbon atoms and $R^{33}$ is selected from the group of radicals consisting of hydrogen and alkyls having from 1 to 12 carbon atoms and wherein $R^3$ and $R^4$ are alkyls having from 1 to 4 carbon atoms, and wherein $R^{26}$, $R^{27}$, $R^{28}$, $R^{29}$, $R^{30}$ and $R^{31}$ are independently selected from the group of radicals consisting of hydrogen and alkyls having 1 to 4 carbon atoms.

6. The antidegradant system of claim 1 wherein the phenolic antidegradant is selected from the group consisting of:
(A) trialkylated phenolic antioxidants having the structural formula:

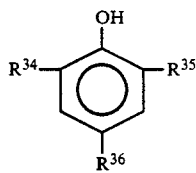

wherein $R^{34}$ and $R^{35}$ are selected from the group of radicals consisting of hydrogen, tertiary alkyls having 4 to 9 carbon atoms, cycloalkyls having 5 to 12 carbon atoms and aralkyls having 7 to 12 carbon atoms and wherein $R^{36}$ is selected from the group of radicals consisting of alkyls having 1 to 20 carbon atoms, cycloalkyls having 5 to 12 carbon atoms and aralkyls having 7 to 12 carbon atoms.
(B) alkylated reaction products of phenols and dicyclopentadiene;
(C) styrenated phenols;
(D) alkylated hydroquinone; and
(E) the reaction product of a (1) polyphenolic compound selected from the group consisting of 2,6-bis-(2-hydroxy-3-tert.butyl-5-methylbenzyl)-4-methylphenol; 2,2'-methylene-bis-(4-methyl-6-tert.butylphenol); 2,2'-methylene-bis-(4-ethyl-5-tert.butylphenol); and 2,6-bis-(2-hydroxy-3-tert.butyl-5-ethyl benzyl)-4-ethylphenol, with (2) an ester forming compound of the general formula:

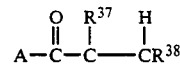

wherein $R^{37}$ is selected from the group consisting of hydrogen and alkyl radicals having from 1 to 4 carbon atoms, $R^{38}$ is selected from the group consisting of hydrogen and alkyl radicals having from 1 to 4 carbon atoms, and wherein A is selected from the group consisting of chlorine, iodine and bromine.

7. The antidegradant system of claim 1 wherein the molar ratio of the polymerizable synergist to the amine or phenolic antidegradant ranges from about 1:4 to 2:1.

8. The antidegradant system of claim 6 wherein said reaction product of a (1) polyphenolic compound with (2) an ester is selected from the group consisting of 2-(2-hydroxy-3-t.-butyl-5-ethylbenzyl)-4-ethyl-6-t.-butyl phenylmethacrylate; 2-(2-hydroxy-3-t.butyl-5-methylbenzyl)-4-methyl-6-t.butyl phenylmethacrylate; 2,6-bis-(2-hydroxy-3-t.butyl-5-methylbenzyl)- 4-methyl phenylmethacrylate; and 2-(2-hydroxyl-3-t.butyl-5-methylbenzyl)-4-methyl-6-t.butyl phenylacrylate.

9. A stabilized polymer comprising:
(A) a polymer selected from the group consisting of:
(1) homopolymers and copolymers of monoolefins;
(2) natural rubber; and
(3) synthetic rubber derived from a diene monomer;
(B) from about 0.05 to about 10 parts by weight based upon 100 parts of polymer of an antidegradant selected from the group consisting of phenolic antidegradants, amine antidegradants and mixtures thereof; and
(C) from about 0.05 to about 20 parts by weight based upon 100 parts of polymer of a polymerizable synergist having the structural formula:

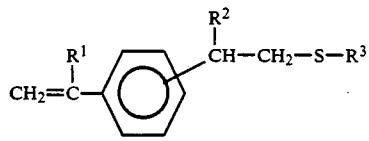

wherein $R^1$ is selected from the group consisting of hydrogen or an alkyl having 1 carbon atoms, $R^2$ is selected from the group consisting of hydrogen or an alkyl having 1 carbon atom, $R^3$ is selected from the group consisting of an alkyl having from 1 to 20 carbon atoms, an aralkyl having from 7 to 20 carbon atoms, an aryl having from 6 to 18 carbon atoms, and an alkaryl having from 7 to 20 carbon atoms.

10. The stabilized polymer of claim 9 wherein the amine antioxidant is selected from the group consisting of polymerized and non-polymerized derivatives of:
(A) 2,2,4-trimethyl-1,2-dihydroquinoline;
(B) N,N'-di-substituted-p-phenylenediamines having the structural formula:

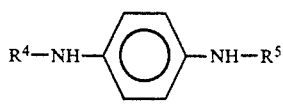

wherein $R^4$ and $R^5$ are independently selected from the group of radicals consisting of alkyls having 3 to 12 carbon atoms, aryls having 6 to 12 carbon atoms, and aralkyls having 7 to 12 carbon atoms;
(C) diphenylamines having the structural formula:

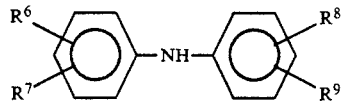

wherein $R^6$, $R^7$, $R^8$ and $R^9$ are independently selected from the group of radicals consisting of hydrogen, alkyls having 1 to 20 carbon atoms and aralkyls having 7 to 12 carbon atoms;
(D) amides having the structural formula:

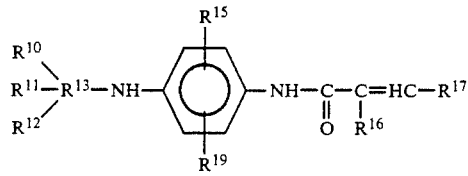

wherein $R^{13}$ is selected from the group of radicals consisting of arylenes having 6 to 12 carbon atoms, $R^{10}$ and $R^{11}$ are independently selected from the group of radicals consisting of hydrogen, alkyls having from 1 to 4 carbon atoms and alkoxys having from 1 to 4 carbon atoms, $R^{12}$ is selected from the group of radicals consisting of hydrogen, alkyls having from 1 to 4 carbon atoms, alkoxys having from 1 to 4 carbon atoms and a radical having the following structural formula:

wherein $R^{18}$ is selected from the group of radicals consisting of alkyls having from 1 to 12 carbon atoms, cycloalkyls having from 5 to 12 carbon atoms, aryls having from 6 to 12 carbon atoms and aralkyls having from 7 to 13 carbon atoms and $R^{19}$ is selected from the group of radicals consisting of hydrogen and alkyls having from 1 to 12 carbon atoms and wherein $R^{14}$ and $R^{15}$ are selected from the group of radicals consisting of hydrogen, alkyls having from 1 to 4 carbon atoms, $R^{16}$ is selected from the group of radicals consisting of hydrogen, alkyls having from 1 to 4 carbon atoms, aryls having from 6 to 12 carbon atoms, aralkyls having from 7 to 13 carbon atoms, cycloalkyls having from 5 to 12 carbon atoms, carboxymethyl radicals and carbalkoxymethyl radicals, and $R^{17}$ is selected from the group of radicals consisting of hydrogen, alkyls having from 1 to 4 carbon atoms, aryls having from 6 to 12 carbon atoms, cycloalkyls having from 5 to 12 carbon atoms, cycloalkyls having from 5 to 12 carbon atoms, carboxyl radicals and carboalkoxy radicals, and;
(E) imides having the structural formula:

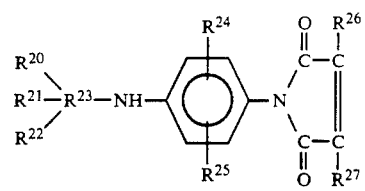

and

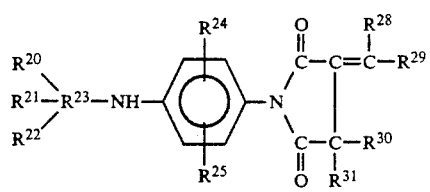

wherein $R^{23}$ is selected from the group of radicals consisting of arylenes having 6 to 12 carbon atoms, $R^{20}$ and $R^{21}$ are independently selected from the group of radicals consisting of hydrogen, alkyls having from 1 to 4 carbon atoms and alkoxys having from 1 to 4 carbon atoms, $R^{22}$ is selected from the group of radicals consisting of hydrogen, alkyls having from 1 to 4 carbon atoms, alkoxys having from 1 to 4 carbon atoms and a radical having the following structural formula:

wherein $R^{32}$ is selected from the group of radicals consisting of alkyls having from 1 to 12 carbon atoms, cycloalkyls having from 5 to 12 carbon atoms, aryls having from 6 to 12 carbon atoms and aralkyls having from 7 to 13 carbon atoms and $R^{33}$ is selected from the group of radicals consisting of hydrogen and alkyls having from 1 to 12 carbon atoms and wherein $R^3$ and $R^4$ are alkyls having from 1 to 4 carbon atoms, and wherein $R^{26}$, $R^{27}$, $R^{28}$, $R^{29}$, $R^{30}$ and $R^{31}$ are independently selected from the group of radicals consisting of hydrogen and alkyls having 1 to 4 carbon atoms.

11. The stabilized polymer of claim 9 wherein the phenolic antidegradant is selected from the group consisting of:
(A) trialkylated phenolic antioxidants having the structural formula:

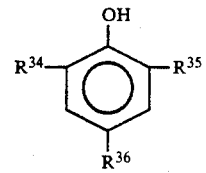

wherein $R^{34}$ and $R^{35}$ are selected from the group of radicals consisting of hydrogen, tertiary alkyls having 4 to 9 carbon atoms, cycloalkyls having 5 to 12 carbon atoms and aralkyls having 7 to 12 carbon atoms and wherein $R^{36}$ is selected from the group of radicals consisting of alkyls having 1 to 20 carbon atoms, cycloalkyls having 5 to 12 carbon atoms and aralkyls having 7 to 12 carbon atoms.

(B) alkylated reaction products of phenols and dicyclopentadiene;

(C) styrenated phenols;

(D) alkylated hydroquinone; and (E) the reaction product of a (1) polyphenolic compound selected from the group consisting of 2,6-bis-(2-hydroxy-3-tert.butyl-5-methylbenzyl)-4-methylphenol; 2,2'-methylene-bis-(4-methyl-6-tert.butylphenol); 2,2'-methylene-bis-(4-ethyl-5-tert.butylphenol); and 2,6-bis-(2-hydroxy-3-tert.butyl-5-ethyl benzyl)-4-ethylphenol, with (2) an ester forming compound of the general formula:

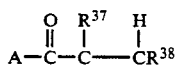

wherein $R^{37}$ is selected from the group consisting of hydrogen and alkyl radicals having from 1 to 4 carbon atoms, $R^{38}$ is selected from the group consisting of hydrogen and alkyl radicals having from 1 to 4 carbon atoms, and wherein A is selected from the group consisting of chlorine, iodine and bromine.

12. The stabilized polymer of claim 9 wherein the molar ratio of the polymerizable synergist to the amine or phenolic antidegradant ranges from about 1:4 to 2:1.

13. The stabilized polymer of claim 11 wherein said reaction product of a (1) polyphenolic compound with (2) an ester is selected from the group consisting of 2-(2-hydroxy-3-t.-butyl-5-ethylbenzyl)-4-ethyl-6-t.-butyl phenylmethacrylate; 2-(2-hydroxy-3-t.butyl--5-methylbenzyl)-4-methyl-6-t.butyl phenylmethacrylate; 2,6-bis-(2-hydroxy-3-t.butyl-5-methylbenzyl)-4-methyl phenylmethacrylate; and 2-(2-hydroxyl-3-t.butyl-5-methylbenzyl)-4-methyl-6-t.butyl phenylacrylate.

14. The stabilized polymer of claim 9 wherein said polymer is selected from the group consisting of polypropylene, polyethylene, natural rubber, nitrile butadiene rubber, acrylonitrile-butadiene styrene rubber, styrene butadiene rubber, polybutadiene, ethylene-propylene-diene rubber, butyl rubber, polyisoprene and styrene-butadiene-isoprene copolymers.

15. The stabilized polymer of claim 14 wherein said polymer is selected from the group consisting of nitrile-butadiene rubber and styrene-butadiene rubber.

* * * * *